(12) United States Patent
Takahashi et al.

(10) Patent No.: US 10,153,882 B2
(45) Date of Patent: Dec. 11, 2018

(54) USER EQUIPMENT AND CAPABILITY REPORTING METHOD

(71) Applicant: NTT DOCOMO, INC., Tokyo (JP)

(72) Inventors: Hideaki Takahashi, Tokyo (JP); Hiromasa Umeda, Tokyo (JP); Kengo Yagyu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 14/876,346

(22) Filed: Oct. 6, 2015

(65) Prior Publication Data

US 2016/0198452 A1    Jul. 7, 2016

(30) Foreign Application Priority Data

Aug. 8, 2014   (JP) .................................. 2014-162527

(51) Int. Cl.
*H04W 72/04*   (2009.01)
*H04L 5/00*    (2006.01)
*H04W 28/18*   (2009.01)
*H04W 8/24*    (2009.01)

(52) U.S. Cl.
CPC ........... *H04L 5/0053* (2013.01); *H04W 28/18* (2013.01); *H04L 5/001* (2013.01); *H04L 5/0094* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 2011/0310781 A1* | 12/2011 | Kim | ...................... | H04L 5/0007 370/311 |
| 2012/0184281 A1* | 7/2012 | Kim | .................. | H04W 72/0453 455/450 |
| 2013/0250819 A1 | 9/2013 | Khlat et al. | | |
| 2014/0213268 A1* | 7/2014 | Sagae | ..................... | H04L 5/001 455/450 |

(Continued)

FOREIGN PATENT DOCUMENTS

JP     2013042305 A    2/2013

OTHER PUBLICATIONS

Office Action issued in corresponding Japanese Application No. 2014-162527, dated Feb. 21, 2017 (5 pages).

(Continued)

*Primary Examiner* — Eunsook Choi
(74) *Attorney, Agent, or Firm* — Osha Liang LLP

(57) ABSTRACT

The present disclosure relates to some techniques for controlling carrier aggregation properly in a radio communication system including a mixture of harmonic-supported user equipments and harmonic-unsupported user equipments. One aspect of the present invention relates to a user equipment having a carrier aggregation function, comprising: a communication control unit configured to control radio communication with a base station; a capability management unit configured to manage a requirement on transmission and reception characteristics supported by the user equipment for each combination of carrier aggregation frequency bands; and a capability reporting unit configured to report the requirement on the transmission and reception characteristics supported by the user equipment as a capability to the base station.

7 Claims, 6 Drawing Sheets

(56) References Cited

U.S. PATENT DOCUMENTS

2015/0189493 A1* 7/2015 Lee ................... H04W 76/02
370/329

OTHER PUBLICATIONS

Qualcomm Incorporated, AT&T, Nokia Corporation; "Introduction of Band 4 + Band 17 inter-band CA configuration into 36.101"; 3GPP TSG-RAN WG4 Meeting #64, R4-124635; Qingdao, China; Aug. 13-17, 2012 (12 pages).

3GPP TS 36.101 V12.4.0; "3rd Generation Partnership Project; Technical Specification Group Radio Access Network; Evolved Universal Terrestrial Radio Access (E-UTRA); User Equipment (UE) radio transmission and reception (Release 12)"; Jun. 2014 (531 pages).

3GPP TS 36.306 V12.5.0; "3rd Generation Partnership Project; Technical Specification Group Radio Access Network; Evolved Universal Terrestrial Radio Access (E-UTRA); User Equipment (UE) radio access capabilities (Release 12)"; Jun. 2015 (44 pages).

3GPP TS 36.331 V12.6.0; "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015 (449 pages).

3GPP TS 36.101 V12.6.0; "3rd Generation Partnership Project; Technical Specification Group Radio Access Network; Evolved Universal Terrestrial Radio Access (E-UTRA); User Equipment (UE) radio transmission and reception (Release 12)"; Dec. 2014 (589 pages).

* cited by examiner

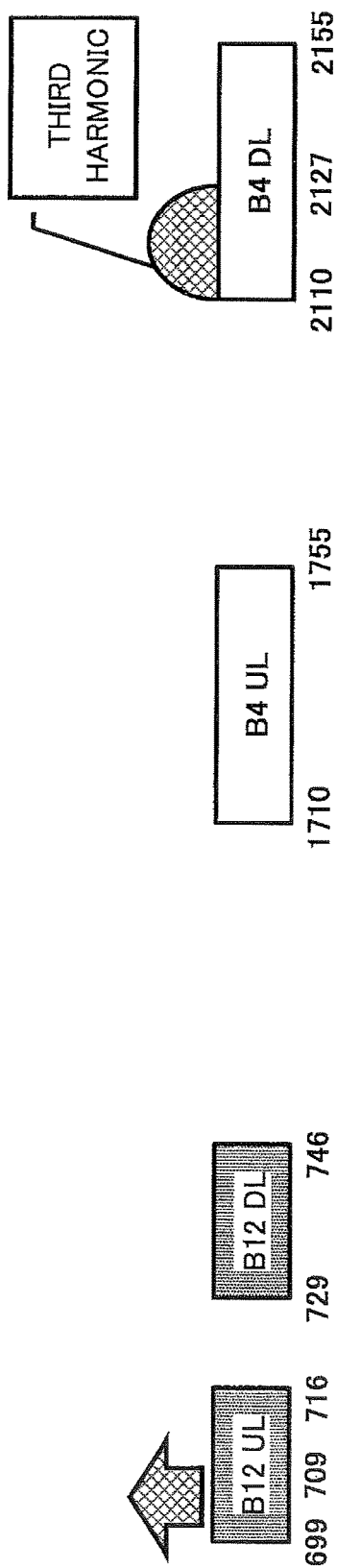
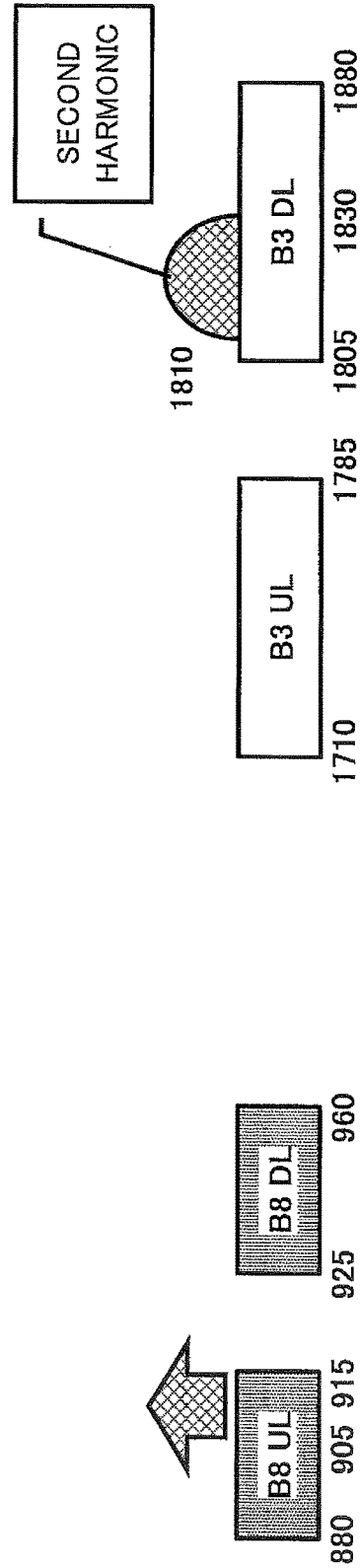

FIG. 3

6.2.5  Configured transmitted power
Table 6.2.5-2: $\Delta T_{IB,c}$
$\Delta T_{IB,c}$ is the additional tolerance for serving cell c as specified in Table 6.2.5-2; $\Delta T_{IB,c} = 0$ dB otherwise;

| Inter-band CA Configuration | E-UTRA Band | $\Delta T_{IB,c}$ [dB] |
|---|---|---|
| CA_1A-5A | 1 | 0.3 |
|  | 5 | 0.3 |
| CA_4A-12A | 4 | 0.3 |
|  | 12 | 0.8 |

FILTERING LOSS 0.5 dB is added to Band 12

7.3.1A  Minimum requirements (QPSK) for CA
Table 7.3.1A-0a:
Reference sensitivity for carrier aggregation QPSK $P_{REFSENS, CA}$ (exceptions)

FOR EXAMPLE, −100 dBm IS FOR NO FILTER, BUT AREA OF −90 dBm IS REDUCED BY 10 dB

| EUTRA CA Configuration | EUTRA band | Channel bandwidth | | | | | | Duplex mode |
|---|---|---|---|---|---|---|---|---|
| | | 1.4 MHz (dBm) | 3 MHz (dBm) | 5 MHz (dBm) | 10 MHz (dBm) | 15 MHz (dBm) | 20 MHz (dBm) | |
| CA_3A-8A⁴ | 3 |  |  | N/A | N/A | N/A | N/A | FDD |
|  | 8 | [−89.2] | [−89.2] | [−90] | [−89.5] | [−89] | [−88.5] |  |
| CA_4A-12A⁵,⁶ | 4 |  |  | −96.5 | −93.5 |  |  | FDD |
|  | 12 |  |  | [−90] | [−89.5] |  |  |  |
| CA_4A-17A⁵,⁶ | 4 |  |  | −96.5 | −93.5 |  |  | FDD |

NOTE 1: The transmitter shall be set to $P_{UMAX}$ as defined in subclause 6.2.5A.
NOTE 2: Reference measurement channel is A.3.2 with one sided dynamic OCNG Pattern OP.1 FDD/TDD as described in Annex A.5.1.1/A.5.2.1.
NOTE 3: The signal power is specified per port.
NOTE 4: No requirements apply when there is at least one individual RE within the uplink transmission bandwidth of the low band for which the 2nd transmitter harmonic is within the downlink transmission bandwidth of the high band. The reference sensitivity is only verified when this is not the case (the requirements specified in clause 7.3.1 apply).
NOTE 5: These requirements apply when there is at least one individual RE within the uplink transmission bandwidth of the low band for which the 3rd transmitter harmonic is within the downlink transmission bandwidth of the high band.
NOTE 6: The requirements should be verified for UL EARFCN of the low band (superscript LB) such that in MHz and with the carrier frequency of the high band in MHz and the channel bandwidth configured in the low band.

UE-EUTRA-Capability information element

```
-- ASN1START
<<< skip unchanged part >>>
UE-EUTRA-Capability-v1130-IEs ::=   SEQUENCE {
    pdcp-Parameters-v1130               PDCP-Parameters-v1130,
    phyLayerParameters-v1130            PhyLayerParameters-v1130,
    rf-Parameters-v1130                 RF-Parameters-v1130,
    measParameters-v1130                MeasParameters-v1130,
    interRAT-ParametersCDMA2000-v1130   IRAT-ParametersCDMA2000-v1130,
    otherParameters-r11                 Other-Parameters-r11,
    fdd-Add-UE-EUTRA-Capabilities-v1130 UE-EUTRA-CapabilityAddXDD-Mode-v1130OPTIONAL,
    tdd-Add-UE-EUTRA-Capabilities-v1130 UE-EUTRA-CapabilityAddXDD-Mode-v1130OPTIONAL,
    nonCriticalExtension                UE-EUTRA-Capability-v12xy-IEs               OPTIONAL
}
UE-EUTRA-Capability-v12xy-IEs ::=   SEQUENCE {
    rf-Parameters-v12xy                 RF-Parameters-v12xy,
    nonCriticalExtension                SEQUENCE {}                                 OPTIONAL
}
<<< skip unchanged part >>>
RF-Parameters-v12xy ::=             SEQUENCE {
    supportedBandCombination-v12xy      SupportedBandCombination-v12xy              OPTIONAL
}
<<< skip unchanged part >>>
SupportedBandCombination-v12xy ::= SEQUENCE (SIZE (1..maxBandComb-r10)) OF BandCombinationParameters-v12xy
<<< skip unchanged part >>>
BandCombinationParameters-v12xy ::= SEQUENCE {
    bandParameterList-r12               SEQUENCE (SIZE (1..maxSimultaneousBands-r10)) OF BandParameters-v12xy OPTIONAL,
    ...
}
<<< skip unchanged part >>>
BandParameters-v12xy ::=            SEQUENCE {
    txRx-Req-r12                        ENUMERATED {req1, req2, ...}                OPTIONAL,
    ...
}
<<< skip unchanged part >>>
-- ASN1STOP
```

| UE-EUTRA-Capability field descriptions | FDD/ TDD diff |
|---|---|
| *txRx-Req* <br> Indicates the Tx and Rx performance requirements which the UE supports for a given CA band combination. req1 refers to the requirement 1 specified in TS 36.101 and so on. | -- |

FIG. 6

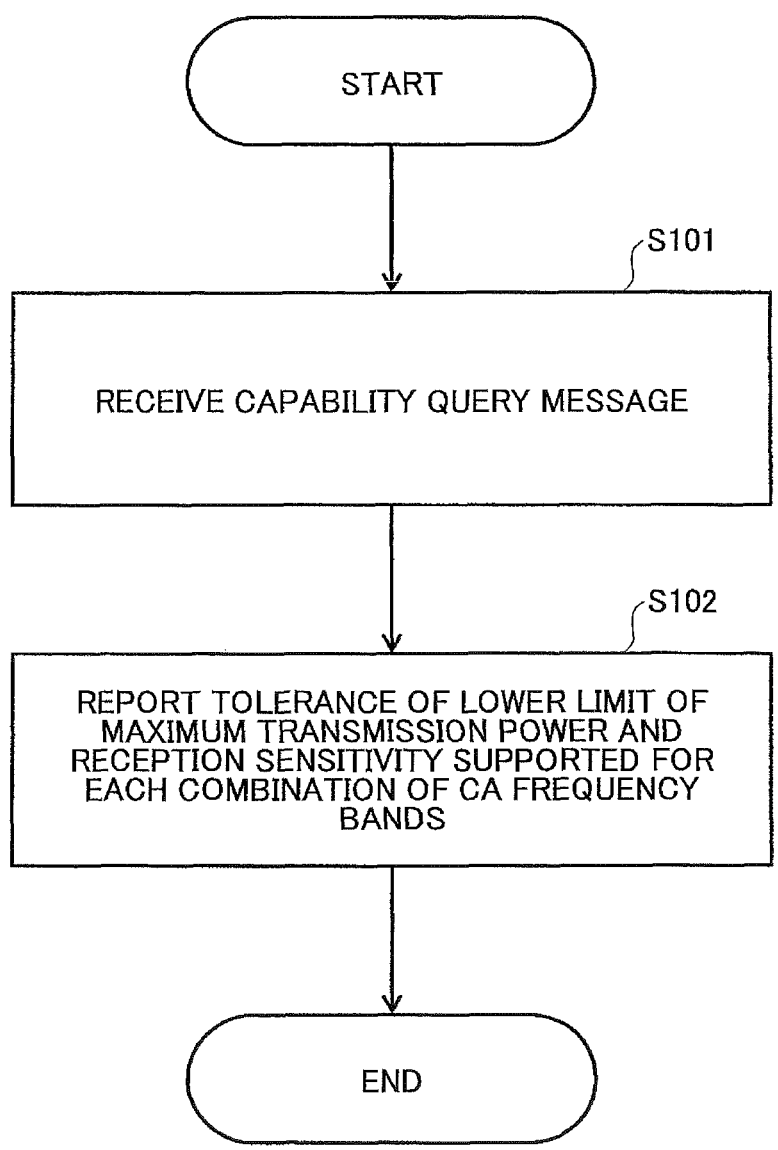

USER EQUIPMENT AND CAPABILITY REPORTING METHOD

TECHNICAL FIELD

The present invention relates to a radio communication system.

BACKGROUND ART

Presently, as a next-generation communication standard of a LTE (Long Term Evolution) system, specifications to design a LTE-Advanced system and its enhancement are being developed. In the LTE-Advanced system, a carrier aggregation (CA) technique is introduced to achieve a higher throughput than a LTE system while ensuring backward compatibility with the LTE system. In the carrier aggregation, a component carrier (CC) having the maximum bandwidth of 20 MHz supported by the LTE system is utilized as a basic component, and it is designed to implement communications in a wider band by employing such multiple component carriers simultaneously.

In the carrier aggregation, a user equipment (UE) can communicate with a base station (evolved NodeB: eNB) by using multiple component carriers simultaneously. In the carrier aggregation, a primary cell (PCell) having a high reliability to ensure connectivity to the user equipment and a secondary cell (SCell) additionally configured for the user equipment connecting to the primary cell are configured. The primary cell is similar to a serving cell in the LIE system and serves as a cell to ensure connectivity between the user equipment and a network. On the other hand, the secondary cell is a cell configured for the user equipment in addition to the primary cell.

In inter-band carrier aggregation where different frequency bands are used simultaneously, there is a case where harmonic effect may arise due to a relative relationship between combinations of frequency bands and frequency positions owned by an operator in the frequency bands. Specifically, a harmonic of a transmission band at a lower frequency band side falls in a reception band at a higher frequency band side, which may degrade sensitivity in the reception band.

In the current LTE specification, it is known that for a combination of frequency band 4 (B4) and frequency band 12 (B12), a harmonic may degrade reception sensitivity. In the LTE specification, it is defined that the lower frequency band 12 consists of an uplink frequency band (B12 UL) of 699-716 MHz and a downlink frequency band (B12 DL) of 729-746 MHz, and the higher frequency band 4 consists of an uplink frequency band (B4 UL) of 1710-1755 MHz and a downlink frequency band (B4 DL) of 2110-2155 MHz. For the combination of the frequency band 4 and the frequency band 12, as illustrated in FIG. 1, it is known that the third harmonic arising from transmissions of 699-709 MHz in the B12 UL falls in the reception band of 2110-2127 MHz in the B4 DL, which may degrade the reception sensitivity.

Also, it is known that for a combination of frequency band 3 (B3) and frequency band 8 (B8), a harmonic may also degrade the reception sensitivity. In the LTE specification, it is defined that the lower frequency band 8 consists of an uplink frequency band (B8 UL) of 880-915 MHz and a downlink frequency band (B8 DL) of 925-960 MHz and the higher frequency band 3 consists of an uplink frequency band (B3 UL) of 1710-1785 MHz and a downlink frequency band (B3 DL) of 1805-1880 MHz. For the combination of the frequency band 3 and the frequency band 8, as illustrated in FIG. 2, the second harmonic arising from transmissions at 905-915 MHz of the B8 UL falls in a reception band of 1810-1830 MHz of the B3 DL, which may degrade the reception sensitivity.

Presently, the specification is defined based on two patterns with respect to degradation of the reception sensitivity due to the harmonics. In the first pattern, a low-pass filter is inserted in a user equipment to provide support for the harmonic. The introduction of the low-pass filter causes the harmonic to be cut, which improves the degradation of the reception sensitivity in the higher frequency band side. On the other hand, transmission and reception characteristics must be relaxed in compensation. For example, for the combination of the frequency band 4 and the frequency band 12 in the carrier aggregation as stated above, it is assumed that a low-pass filter is inserted between a duplexer and a switch for the lower frequency band 12 so as to cut the harmonic. In the LTE specification, it is designed to relax the transmission and reception characteristics based on this assumption. Specifically, as illustrated in FIG. 3, a tolerance of a lower limit of maximum transmission power and reception sensitivity for the frequency band 12 are relaxed. As illustrated, for the combination of the frequency band 4 and the frequency band 12 (CA_4A-12A), the tolerance $\Delta T_{IB,c}$ of the lower limit of the maximum transmission power is set to 0.8 dB, and 0.5 dB corresponding to a loss caused by the low-pass filter is added compared to the other tolerances 0.3 dB. Also, for the combination of the frequency band 4 and the frequency band 12 (CA_4A-12A), the reception sensitivity of the frequency band 4 is set to −90 dBm, that is, the reception sensitivity of the frequency band 4 is relaxed by 10 dBm from −100 dBm for the case where no low-pass filter is installed. Correspondingly, the communication area is reduced. The first pattern is applied to the case where sensitivity degradation due to the harmonic may arise in operator's actually providing services.

In the second pattern, on the other hand, no support for the harmonic is implemented, although the above-stated sensitivity degradation due to the harmonic arises. From a viewpoint of frequency positions owned by an operator, there is a case where the sensitivity degradation due to the harmonic is of no matter in operator's actually providing services. To this end, no support for the harmonic such as insertion of a low-pass filter is implemented, and the relaxation of the transmission and reception characteristics as stated above in conjunction with the first pattern is not defined. For example, for the combination of the frequency band 3 and the frequency band 8 as illustrated in FIG. 2, it is known that the second harmonic arising from transmissions at 905-915 MHz in the B8 UL may fall in the reception band of 1810-1830 MHz in the B3 DL. Since there is no operator that uses these two frequency bands, however, no relaxation of the transmission and reception characteristics is currently defined for the combination of the frequency band 3 and the frequency band 8 differently from the combination of the frequency band 4 and the frequency band 12 as described with reference to FIG. 3.

See 3GPP TS36.101 V12.4.0 (2014 June) for further details, for example.

SUMMARY OF INVENTION

Problem to be Solved by the Invention

Meanwhile, the above-stated patterns may be replaced with each other in the future through new frequency assignment, reorganization of operators or the like. For example, it is likely that the case where the sensitivity degradation due to the harmonic is not problematic (the second case) may change into the case where the sensitivity degradation due to the harmonic is problematic (the first pattern) through the new frequency assignment, the reorganization of operators or the like. In this case, a mixture of harmonic-unsupported user equipments that have been used since before the new frequency assignment or the operator reorganization and harmonic-supported user equipments that have been sold after the new frequency assignment or the operator reorganization would exist in a radio communication system. Then, these user equipments would indicate the same capability (UE Capability) to a network as a carrier aggregation configuration. However, according to the current situation, the network cannot distinguish the harmonic-supported user equipments from the harmonic-unsupported user equipments based on the indicated capability, although they have transmission and reception characteristics different from each other. As a result, it is difficult for the network to perform the inter-band carrier aggregation for the user equipments properly.

In light of the above-stated problems, an object of the present invention is to provide some techniques for controlling the carrier aggregation properly in a radio communication system including a mixture of the harmonic-supported user equipments and the harmonic-unsupported user equipments.

Means for Solving the Problem

In order to overcome the above-stated problems, one aspect of the present invention relates to a user equipment having a carrier aggregation function, comprising: a communication control unit configured to control radio communication with a base station; a capability management unit configured to manage a requirement on transmission and reception characteristics supported by the user equipment for each combination of carrier aggregation frequency bands; and a capability reporting unit configured to report the requirement on the transmission and reception characteristics supported by the user equipment as a capability to the base station.

Another aspect of the present invention relates to a capability reporting method for use in a user equipment having a carrier aggregation function, comprising: receiving a capability query message for causing the user equipment to report a requirement on transmission and reception characteristics supported by the user equipment for each combination of carrier aggregation frequency bands from a base station; and reporting the requirement on the transmission and reception characteristics supported by the user equipment as a capability to the base station.

Advantage of the Invention

According to the present invention, it is possible to provide some techniques for controlling the carrier aggregation properly in a radio communication system including a mixture of the harmonic-supported user equipments and the harmonic-unsupported user equipments.

BRIEF DESCRIPTION OF DRAWINGS

FIG. 1 is a schematic diagram for illustrating an exemplary harmonic effect in inter-band carrier aggregation;

FIG. 2 is a schematic diagram for illustrating an exemplary harmonic effect in inter-band carrier aggregation;

FIG. 3 is a diagram for illustrating exemplary harmonic-supported LTE specification;

FIG. 6 is a diagram for illustrating exemplary signaling for reporting capabilities according to one embodiment of the present invention; and FIG. 7 is a flowchart for illustrating capability reporting operation according to one embodiment of the present invention.

EMBODIMENTS OF THE INVENTION

Embodiments of the present invention are described below with reference to the drawings.

In the embodiments as described below, a user equipment having a carrier aggregation function is disclosed. Briefly overviewing the present invention, for each combination of frequency bands in inter-band carrier aggregation, one or more requirements on transmission and reception characteristics of a user equipment, such as combinations of tolerances of lower limits of the maximum transmission power and reception sensitivity, are defined in a radio communication system, and for combinations where harmonics degrade the reception sensitivity, different requirements are defined depending on whether the user equipment is harmonic-supported. For each combination of carrier aggregation frequency bands, the user equipment identifies a requirement on the transmission and reception characteristics supported by the user equipment from the requirements defined in the radio communication system depending on whether the user equipment is harmonic-supported and stores the identified requirements as capabilities. Upon receiving a capability query message from a base station, the user equipment reports the stored requirements on the transmission and reception characteristics as the capabilities to the base station.

In this manner, carrier aggregation for user equipments can be properly controlled in the radio communication system including a mixture of harmonic-supported user equipments and harmonic-unsupported user equipments.

Figure 4A:
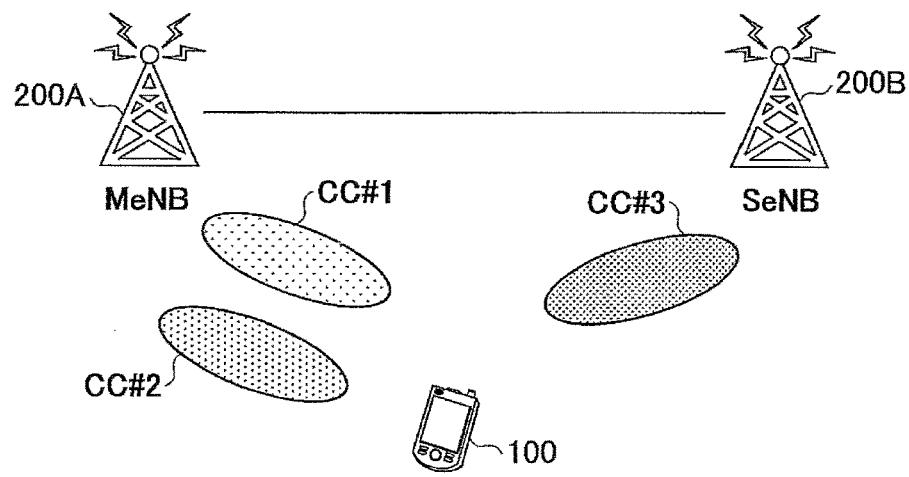
FIG. 4A is a schematic diagram for illustrating a radio communication system according to one embodiment of the present invention.

A radio communication system according to one embodiment of the present invention is described with reference to FIG. 4A. FIG. 4A is a schematic diagram for illustrating a radio communication system according to one embodiment of the present invention.

As shown in FIG. 4A, a radio communication system 10 includes a user equipment 100 and base stations 200A, 200B (which may be collectively referred to as base stations 200 hereinafter). The radio communication system 10 supports carrier aggregation where the user equipment 100 uses component carriers CC #1, CC #2 and CC #3 served by the base stations 200A, 200B for simultaneous communications.

The user equipment 100 has a carrier aggregation function and can perform the simultaneous communications by using multiple cells served by one or more base stations 200. As illustrated, the user equipment 100 may communicate in carrier aggregation where CC #1 and CC #2 served by the single base station 200A are used simultaneously (intra-eNB CA). In inter-band carrier aggregation, CC #1 and CC #2 are served at different frequency bands. Also, the user equipment 100 may communicate in dual connectivity where CC #1 and CC #3 served by the two different base stations 200A and 200B, that is, master base station (MeNB) 200A and secondary base station (SeNB) 200B, respectively, are used simultaneously. In the inter-band carrier aggregation, CC #1 and CC #3 are served at different frequency bands. In the illustrated embodiment, only the two base stations 200A, 200B are shown, but a large number of base stations 200 are generally deployed to cover a service area of the radio communication system 10.

Figure 4B:
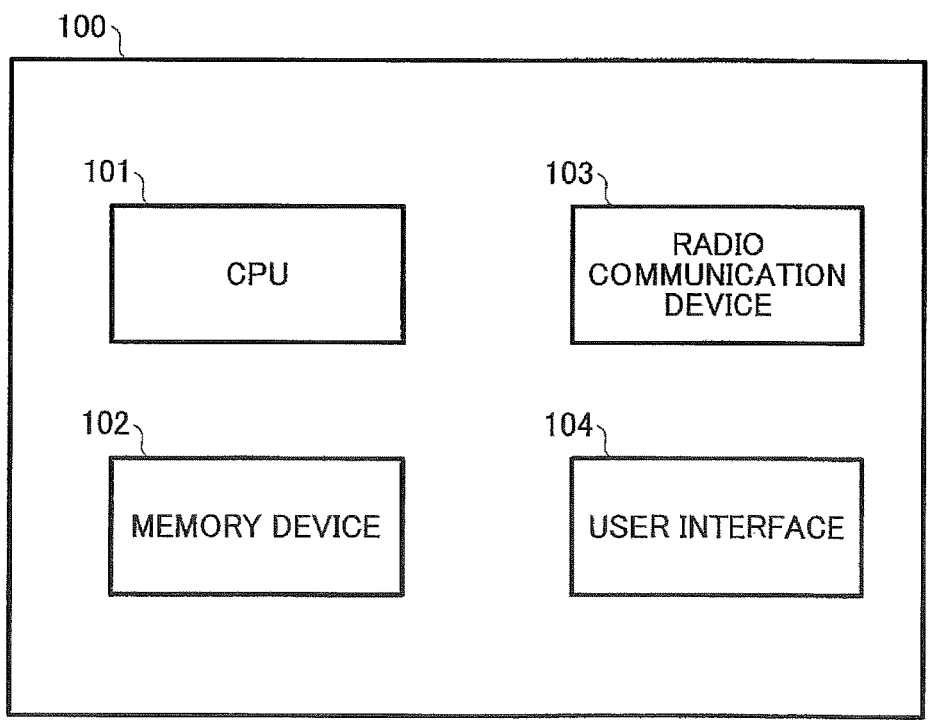
FIG. 4B is a block diagram for illustrating a hardware arrangement of a user equipment according to one embodiment of the present invention.

Typically, the user equipment 100 may be any appropriate information processing apparatus having a radio communication function, such as a smartphone, a cellular phone, a tablet, a mobile router, or a wearable terminal, as illustrated. As illustrated in FIG. 4B, the user equipment 100 includes a CPU (Central Processing Unit) 101 such as a processor, a memory device 102 such as a RAM (Random Access Memory) and a flash memory, a radio communication device 103 for transmitting and receiving radio signals to/from the base stations 200A, 200B, a user interface 104 such as an input/output device and a peripheral device and so on. For example, functions and operations of the user equipment 100 as stated below may be implemented by the CPU 101 processing or executing data and programs stored in the memory device 102. However, the user equipment 100 is not limited to the above-stated hardware configuration and may be configured with circuits implementing one or more operations as stated below.

The base station 200 transmits downlink (DL) packets received from a network device, such as an upper station and a server communicatively connected to a core network (not shown), to the user equipment 100 and transmits uplink (UL) packets received from the user equipment 100 to the network device through radio communications with the user equipment 100 in carrier aggregation. In the intra-eNB CA, the user equipment 100 uses multiple component carriers served by the base station 200A for simultaneous communications. In the dual connectivity CA, on the other hand, the base station 200A serves as a master base station (MeNB) or a primary base station, and the base station 200B serves as a secondary base station (SeNB). In this case, the master base station 200A controls the simultaneous communications in the dual connectivity between the user equipment 100 and the base stations 200A, 200B as well as communications with the upper core network (not shown).

Figure 5:
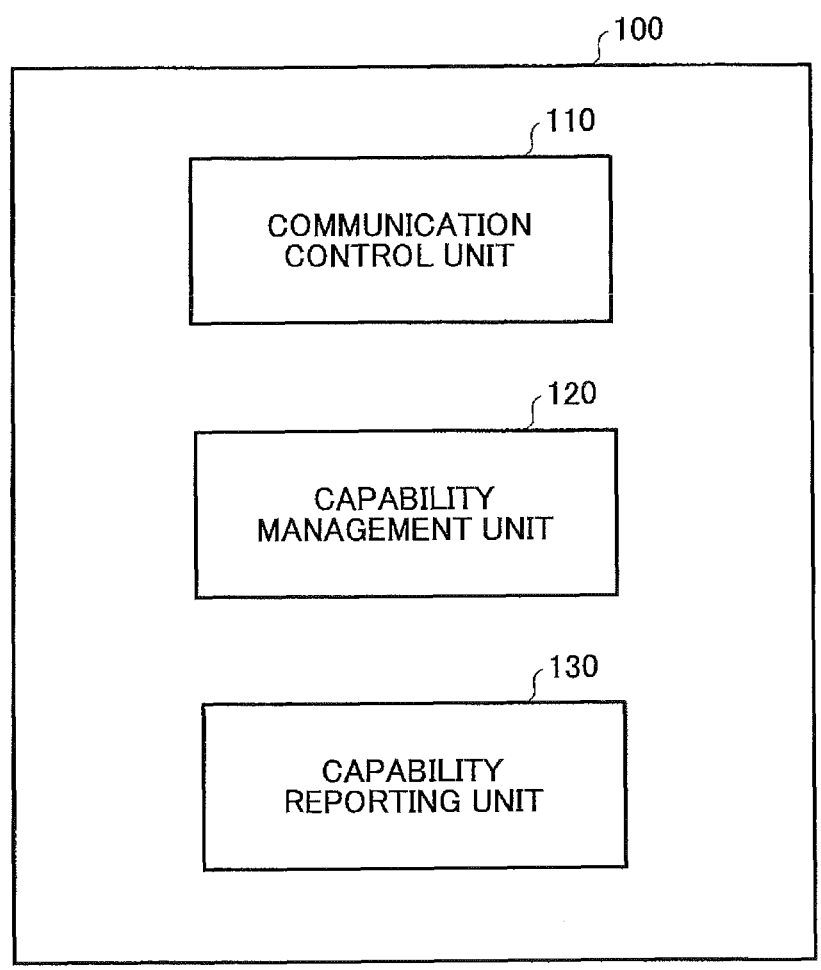
FIG. 5 is a block diagram for illustrating a functional arrangement of a user equipment according to one embodiment of the present invention.

Next, an arrangement of a user equipment according to one embodiment of the present invention is described with reference to FIG. 5. FIG. 5 is a block diagram for illustrating a functional arrangement of a user equipment according to one embodiment of the present invention.

As illustrated in FIG. 5, the user equipment 100 has a communication control unit 110, a capability management unit 120 and a capability reporting unit 130.

The communication control unit 110 controls radio communication with the base station 200. Specifically, the communication control unit 110 controls transmissions and receptions of various radio channels, such as uplink/downlink control channels and uplink/downlink data channels, to/from the base station 200 to implement radio communications with the base station 200. The capability management unit 120 manages a requirement on transmission and reception characteristics supported by the user equipment 100 for each combination of carrier aggregation frequency bands. In one embodiment, the transmission and reception characteristics may include a tolerance of a lower limit of maximum transmission power and reception sensitivity. For example, in LTE specification as illustrated in FIG. 3, the tolerance of the lower limit of the maximum transmission power corresponds to $\Delta T_{IB,c}$, and the reception sensitivity corresponds to QPSK $P_{REFSENS,CA}$. However, the transmission and reception characteristics of the present invention are not limited to them and may be any other appropriate indicator regarding the transmission and reception characteristics.

In one embodiment, one or more requirements on the tolerance of the lower limit of the maximum transmission power and the reception sensitivity are defined for each combination of the carrier aggregation frequency bands in the radio communication system 10, and different requirements defined for a combination of carrier aggregation frequency bands correspond to whether the user equipment 100 is harmonic-supported. In the LTE specification as illustrated in FIG. 3, for each combination of carrier aggregation frequency bands (such as CA_4A-12A), the unique tolerance $\Delta T_{IB,c}$ of the lower limit of the maximum transmission power is defined, and the unique reception sensitivity QPSK $P_{REFSENS,CA}$ corresponding to each channel bandwidth is defined. In this embodiment, on the other hand, for a combination of frequency bands where degradation of the reception sensitivity arises due to harmonics, two or more different requirements on the tolerance of the lower limit of the maximum transmission power and the reception sensitivity corresponding to whether the user equipment 100 is harmonic-supported are defined in the radio communication system 10. For example, a requirement ($\Delta T_{IB,c}$, QPSK $P_{REFSENS,CA}$) having the transmission and reception characteristics unrelaxed may be defined for the harmonic-unsupported user equipment 100 whereas a requirement ($\Delta T_{IB,c}+\delta_T$, QPSK $P_{REFSENS,CA}+\delta_P$) having the transmission and reception characteristics relaxed may be defined for the harmonic-supported user equipment 100. In such a case where two different requirements are defined in the radio communication system 10, the capability management unit 120 stores either one of the defined two requirements depending on whether the user equipment 100 is harmonic-supported.

For example, if the user equipment 100 is harmonic-supported for the combination of carrier aggregation frequency bands where the reception sensitivity degrades due to harmonics, the capability management unit 120 may store the relaxed requirement ($\Delta T_{IB,c}+\delta_T$, QPSK $P_{REFSENS,CA}+\delta_P$) for that combination as the requirement on the transmission and reception characteristics supported by the user equipment 100. On the other hand, if the user equipment 100 is harmonic-unsupported for the combination of carrier aggregation frequency bands where the reception sensitivity degrades due to harmonics, the capability management unit 120 may store the unrelaxed requirement ($\Delta T_{IB,c}$, QPSK $P_{REFSENS,CA}$) for that combination as the requirement on the transmission and reception characteristics supported by the user equipment 100.

Note that the radio communication system 10 may define only a unique requirement for a combination of carrier aggregation frequency bands where no degradation of the reception sensitivity arises due to the harmonics. In this manner, the capability management unit 120 identifies a requirement supported by the user equipment 100 on the tolerance of the lower limit of the maximum transmission power and the reception sensitivity from one or more requirements defined for each combination of carrier aggregation frequency bands and stores the identified requirement.

In one embodiment, the support for the harmonic may include installing a low-pass filter in the user equipment 100. Specifically, it is determined that if a low-pass filter is installed in a lower frequency band of the user equipment 100, the user equipment 100 is harmonic-supported, and if such a low-pass filter is not installed, on the other hand, the user equipment 100 is harmonic-unsupported. However, the harmonic support of the present invention is not limited to the low-pass filter and may be any appropriate means that can prevent a harmonic from the lower frequency band side from falling in a higher frequency band side for a combination of carrier aggregation frequency bands.

The capability reporting unit 130 reports the requirement on the transmission and reception characteristics supported by the user equipment 100 as a capability to the base station 200. Specifically, the capability reporting unit 130 may retrieve a requirement on the transmission and reception characteristics for each combination stored in the capability management unit 120 and report the retrieved requirements as a capability to the base station 200. Also, if one or more to-be-reported combinations of carrier aggregation frequency bands are specified from the base station 200, the capability reporting unit 130 may retrieve requirements on the transmission and reception characteristics for the specified one or more combinations and report the retrieved requirements as the capability to the base station 200.

Upon receiving the requirements supported by the user equipment 100 on the transmission and reception characteristics, the base station 200 controls radio communications with the user equipment 100 depending on the reported requirements. Specifically, the base station 200 determines whether to configure carrier aggregation depending on the reported requirements or controls data scheduling in the configured carrier aggregation. For example, if the requirement for the harmonic-supported user equipment, that is, the requirement having the transmission and reception characteristics relaxed, is reported, the base station 200 may not configure carrier aggregation using the combination of frequency bands corresponding to that requirement for the user equipment 100 being far away from the base station 200. As stated above, according to the requirement for the harmonic-supported user equipment 100, the communication area is reduced. Accordingly, even if the carrier aggregation is configured for the user equipment 100 being far away from the base station 200, there is a likelihood that the radio communication cannot be successfully fulfilled. In one embodiment, when the communication control unit 110 receives a capability query message from the base station 200, the capability reporting unit 130 may report the requirement stored in the capability management unit 120 for each combination of the carrier aggregation frequency bands as the capability to the base station 200. For example, upon receiving a capability query message from the base station 200, the capability reporting unit 130 may report the requirement supported by the user equipment 100 on the transmission and reception characteristics as the capability to the base station 200 by setting the requirement supported by the user equipment 100 to "txRx-Req" field in the capability (UE-EUTRA-Capability-IE) as illustrated in FIG. 6. Accordingly, the base station 200 can identify the requirement supported by the user equipment 100 on the transmission and reception characteristics.

An indication as to whether the user equipment 100 is harmonic-supported may be transmitted with some parameters directly with no use of the above-stated requirement on the transmission and reception characteristics. However, it is considered that utilization of the requirement on the transmission and reception characteristics as stated in conjunction with the above embodiments is preferable from the viewpoint of consistency with the current specification and flexible operations compared to setting the new parameters.

Next, a capability reporting operation for use in a user equipment according to one embodiment of the present invention is described with reference to FIG. 7. FIG. 7 is a flowchart for illustrating a capability reporting operation according to one embodiment of the present invention.

As illustrated in FIG. 10, at step S101, the communication control unit 110 receives a capability query message from the base station 200 for causing the user equipment 100 to report a requirement on the transmission and reception characteristics supported by the user equipment 100 for each combination of carrier aggregation frequency bands. For example, the capability query message may include an instruction for causing the user equipment 100 to report a requirement or requirements supported by the user equipment 100 on the transmission and reception characteristics for each combination or some specified combinations of carrier aggregation frequency bands to the base station 200.

At step S102, in response to the received capability query message, the capability reporting unit 130 reports the requirements supported by the user equipment 100 on the transmission and reception characteristics as a capability to the base station 200. Specifically, the capability reporting unit 130 retrieves the requirements supported by the user equipment 100 on the transmission and reception characteristics from the capability management unit 120 and reports the retrieved requirements as the capability to the base station 200. In one embodiment, the requirement may be a combination of a tolerance of a lower limit of maximum transmission power and reception sensitivity. For a combination of frequency bands where the reception sensitivity degrades due to harmonics, the radio communication system 10 defines a requirement for the harmonic-supported user equipment 100 and a requirement for the harmonic-unsupported user equipment 100, and the capability management unit 120 stores the corresponding one of the requirements based on whether the user equipment 100 is harmonic-supported. The capability management unit 130 reports the stored requirement as a capability to the base station 200. Upon receiving the capability, the base station 200 can configure carrier aggregation or determine whether to conduct data scheduling in the configured carrier aggregation depending on the reported requirement.

Although the embodiments of the present invention have been described in detail, the present invention is not limited to the specific embodiments, and various modifications and variations can be made within the spirit of the present invention as recited in claims.

The present application is based on and claims the benefit of priority of Japanese Priority Application No. 2014-162527 filed on Aug. 8, 2014, the entire contents of which are hereby incorporated by reference.

The invention claimed is:

1. A user equipment having a carrier aggregation function, comprising:
 a processor that controls radio communication with a base station;
 the processor manages a requirement on transmission and reception characteristics supported by the user equipment for each combination of carrier aggregation frequency bands; and
 a transmitter that reports the requirement on the transmission and reception characteristics supported by the user equipment as a capability to the base station, wherein the transmitter, when the processor receives a capability query message from the base station, reports the requirement stored in the processor for each combination of the carrier aggregation frequency bands as the capability to the base station.

2. The user equipment as claimed in claim 1, wherein the transmission and reception characteristics comprises a tolerance of a lower limit of maximum transmission power and reception sensitivity.

3. The user equipment as claimed in claim 2, wherein one or more requirements on the tolerance of the lower limit of the maximum transmission power and the reception sensitivity are defined for each combination of the carrier aggregation frequency bands in a radio communication system, and different requirements defined for a combination of the carrier aggregation frequency bands corresponds to whether the user equipment is harmonic-supported.

4. The user equipment as claimed in claim 3, wherein the support for the harmonic includes installing a low-pass filter in the user equipment.

5. The user equipment as claimed in claim 3, wherein the processor identifies a requirement supported by the user equipment on the tolerance of the lower limit of the maximum transmission power and the reception sensitivity from the one or more requirements defined for each combination of the carrier aggregation frequency bands and store the identified requirement.

6. The user equipment as claimed in claim 4, wherein the processor identifies a requirement supported by the user equipment on the tolerance of the lower limit of the maximum transmission power and the reception sensitivity from the one or more requirements defined for each combination of the carrier aggregation frequency bands and store the identified requirement.

7. A capability reporting method for use in a user equipment having a carrier aggregation function, comprising:
    receiving a capability query message for causing the user equipment to report a requirement on transmission and reception characteristics supported by the user equipment for each combination of carrier aggregation frequency bands from a base station; and
    reporting the requirement on the transmission and reception characteristics supported by the user equipment as a capability to the base station,
    wherein the transmitter, when the processor receives a capability query message from the base station, reports the requirement stored in the processor for each combination of the carrier aggregation frequency bands as the capability to the base station.

* * * * *